United States Patent
Tanaka et al.

[11] Patent Number: 5,746,292
[45] Date of Patent: May 5, 1998

[54] DISK BRAKE DEVICE FOR REDUCING BRAKE NOISE

[75] Inventors: Shinichi Tanaka, Hino; Shigeru Tanaka, Tsuki-gun, both of Japan

[73] Assignee: Hino Jidosha Kogyo Kabushiki Kaisha, Tokyo, Japan

[21] Appl. No.: 670,710

[22] Filed: Jun. 26, 1996

Related U.S. Application Data

[63] Continuation of PCT/JP95/02021, Oct. 4, 1995.

[30] Foreign Application Priority Data

Oct. 28, 1994 [JP] Japan ................................. 6-265712
Nov. 2, 1994 [JP] Japan ................................. 6-269880

[51] Int. Cl.⁶ ........................................... F16D 65/02
[52] U.S. Cl. ........................... 188/73.37; 188/250 E
[58] Field of Search ..................... 188/73.35, 73.36, 188/73.37, 73.38, 250 B, 250 E

[56] References Cited

U.S. PATENT DOCUMENTS 5,099,962  3/1992  Furusu et al. .................... 188/73.37

FOREIGN PATENT DOCUMENTS

| 0563555 | 10/1993 | European Pat. Off. ............ 188/73.36 |
| 59-200819 | 11/1984 | Japan . |
| 60-157526 | 8/1985 | Japan . |
| 1-65944 | 4/1989 | Japan . |
| 3-84436 | 8/1991 | Japan . |
| 3-288028 | 12/1991 | Japan . |
| 5-29546 | 7/1993 | Japan . |
| 8-74897 | 3/1996 | Japan . |

*Primary Examiner*—Matthew C. Graham
*Attorney, Agent, or Firm*—Cushman, Darby & Cushman IP Group of Pillsbury Madison & Sutro LLP

[57] ABSTRACT

Brake noise (the unpleasant "squeal" noise) emitted when a motor vehicle brakes is effectively reduced. In a disk brake which applies a braking force by gripping a disk rotor from both sides by means of two brake pads, a weight is fitted by way of an elastic body to an oscillating member of the disk brake (e.g., brake pad, piston or caliper).

By fitting a weight to an oscillating member by way of an intermediary elastic body, the weight is subject to the vibration of the brake pad and will vibrate. At low frequencies the vibration of the weight is in same phase with the vibration of the brake pad, but as the vibration frequency of the brake pad increases, the vibration of the weight shifts out of phase with the vibration of the brake pad. In the vicinity of a certain frequency and at frequencies above this, this phase difference becomes nearly 180 degrees. By matching this frequency to the brake noise frequency, the vibration of the brake pad can be suppressed by the vibration of the weight.

Simply by adding inexpensive parts, brake noise of a heavy vehicle with large disk brakes can be reduced to a sufficient extent for practical purposes, and the original performance can be maintained even after brake pads have been replaced.

6 Claims, 15 Drawing Sheets

DISK BRAKE DEVICE FOR REDUCING BRAKE NOISE

This application is a continuation of international application PCT/JP95/02021 filed Oct. 4, 1995.

TECHNICAL FIELD

This invention is utilized in motor vehicle brakes and in disk brakes in particular. It relates to a technique for reducing the so-called "brake noise" emitted when a motor vehicle brakes.

BACKGROUND OF THE INVENTION

Much research has been carried out with the aim of reducing the brake noise (the unpleasant "squeal" noise) emitted when a motor vehicle brakes, and many proposals have been made regarding its reduction. The present applicant, too, has been making a close study of this problem for a long time.

The technique disclosed in Jpn. Pat. Laid Open No.3-288028 is a prior application of the present applicant and involves fitting a pressure member to the inside of the rim of a brake shoe by way of a friction member, in order to suppress brake shoe vibration in a drum type brake. The technique disclosed in Jpn. Pat. Laid Open No.1-65944 is an older technique which is equivalent to the prior application of the present applicant, and this too involves fitting a friction member to the inside of the rim.

The technique disclosed in Jpn. Utility Model Laid Open No.3-84436 likewise pertains to the prior application of the present applicant, and involves suppressing brake shoe vibration by fitting a weight to the inside of the rim. At the time at which this technique was disclosed, the idea of interposing an elastic member between the weight and the rim had not been thought of.

Subsequent experimental studies have confirmed the correctness of the analysis and explanation of brake noise phenomena given in the aforementioned Jpn. Pat. Laid Open No.3-288028, and in particular the phenomenon explained with reference to FIG. 8 of the same publication. (This phenomenon will be explained in connection with the embodiments disclosed in the present application.) Namely, it has been found that the main cause of brake noise is vibration of the brake shoe, and that brake shoes vibrate in a radial direction, as shown by the broken lines in FIG. 22.

On the basis of such experimental studies, the present applicant has previously proposed a technique for suppressing vibration in the case of drum type brakes (Jpn. Pat. Appl. No. 6-210204, laid-open as publication No. 08/74897 on Mar. 19, 1996).

The present inventors have likewise carried out detailed studies of disk brakes. These have shown that in the case of disk brakes, the disk rotor and the inner and outer pads which sandwich this disk rotor, vibrate during braking as shown by the broken lines in FIG. 23 and FIG. 24, with resulting occurrence of brake noise.

Brake noise is reduced by the aforementioned techniques, and in the particular case of small passenger cars travelling on ordinary urban roads, it has been reduced to the point where for practical purposes there is hardly a problem at all. However, under certain conditions (and it is not clear what these conditions are) the phenomenon of brake noise still occurs in the case of heavy vehicles, and further research is required to overcome this problem.

The present inventors have observed the phenomena associated with brake noise from disk brakes and have analyzed the results of these observations in a variety of ways. They have carried out experiments and analyses on vibration and have studied concrete measures for suppressing vibration of disk brakes. These experiments and analyses have involved new investigative methods such as displaying vibration on a computer screen in an exaggerated form and correlating it with the frequency characteristics of the sound it produces. As the outcome of these studies, the present inventors propose the technique for disk brakes which is disclosed in this application. Experiments which they have performed have proved that this technique is far more useful than the previously known measures. Moreover, as in the case of drum type brakes, by analyzing data obtained from actual measurements they have succeeded in formulating mathematical expressions for the proposed technique, for the range over which it is effective, and have confirmed that within this range an extremely effective countermeasure is obtained.

The following are objects of the present invention: to reduce brake noise in disk brakes; to provide a technique capable of reducing brake noise from brake pads of various sizes, said reduction being achieved in an optimally effective way and not simply by means of an empirical fix; to enable brake noise of heavy vehicles with large brake pads to be reduced to a sufficient extent for practical purposes; to provide a brake noise reduction technique the performance of which does not change when the pads of the disk brake are replaced; and to reduce brake noise by means of inexpensive additional parts. Further objects of this invention are to improve reliability by suppressing deterioration of elastic bodies and adhesives, and by suppressing the decrease in vibration damping performance of the elastic body; and to provide a vibration damping means capable of maintaining the additional parts in an effective state even in environments in which they are exposed to high temperatures and to severe vibration.

BRIEF SUMMARY OF THE INVENTION

This invention is characterized in that brake noise emitted when a motor vehicle brakes is effectively reduced by fitting a weight by way of an elastic body to a part of the mechanism which presses against the disk rotor in response to hydraulic pressure. Each part of the mechanism which presses against the disk rotor constitutes an oscillating member, and these oscillating members include for example the piston which displaces the brake pad which presses against the disk rotor; the back-plate of the brake pad; and the caliper which holds the brake pads and the piston.

The most important distinguishing feature of this invention is not simply that a weight is fitted, but that a weight is fitted by way of an elastic body. The result of fitting a weight by way of an elastic body is that the domain for free oscillation of the weight is enlarged and a natural vibration frequency is observed for the weight in accordance with the properties of the elastic body. The vibration of the oscillating member is transmitted to the weight, and when this happens in the low frequency region, the oscillating member and the weight vibrate same. However, the following phenomenon is observed: namely, as the frequency of the vibration increases, the vibrations of the oscillating member and the weight gradually shift out of phase, and at or above a certain frequency, the vibration of the oscillating member and the vibration of the weight become opposite in phase. The vibrations of the oscillating member and the weight being opposite in phase is none other than vibration energy being converted to heat energy due to the elastic body deforming, with the result that the vibration of the oscillating member is suppressed. This is the principle of the present invention.

When the weight is fitted by way of the elastic body to the piston, a rod may be fixed upright on the inside of the piston and the weight fitted to this rod by way of the elastic body. Alternatively, the elastic body may be affixed to the inner wall of the piston and the weight fitted to this elastic body. A further possibility is to affix the elastic body to the inner wall of the piston by way of a metal member, and to fit the weight to this elastic body.

When fitting to the back-plate, the portion of the back-plate on the opposite side from the caliper is made to project, an insertion hole is formed in this projecting portion, the elastic body is affixed to the inside of this insertion hole by way of a metal member, and the weight is fitted to this elastic body. Alternatively, a rod which passes through the caliper may be fixed upright on the back-plate, and the weight fitted to this rod by way of the elastic body.

By thus fitting the weight by way of an elastic body, vibration and noise at frequencies in the vicinity of or higher than the natural vibration frequency, which is determined by the weight and the properties of the elastic body, can be effectively suppressed. It has been confirmed experimentally that the phase relation between the vibration of the brake pads and the vibration of the weight can be utilized to suppress vibrations, not just at frequencies higher than the natural vibration frequency, but also at frequencies in the vicinity of and slightly lower than the natural vibration frequency. Here, "rod" broadly signifies a bar-shaped member, and components that are generally called "bolts", "studs" or "pins" are included under this term "rod".

A possible construction is for the elastic body to be formed as a ring shape, and for the aforementioned rod to pass through the centre of this elastic body. The rod may be made of metal, and a ring-shaped weight may be provided so as to encircle the aforementioned elastic body. The rod may be cylindrical in shape. Here, "ring-shaped" includes shapes where the cross section perpendicular to the axis is polygonal, as well as shapes where this cross section is circular.

A support may be fitted to the rod, space provided between this support and the rod, the elastic body provided in such manner that it encircles this support, and a ring-shaped weight provided in such manner that it encircles this elastic body. This construction has the advantage that heat is dissipated from the space between the support and the rod. In addition, direct transfer of generated heat can be prevented by having a concavity formed in the surface of the brake pad that is joined to the oscillating member to which the rod is fitted, said concavity being formed in the vicinity of the location where the weight is fitted.

By analyzing data obtained from actual measurements, the present inventors have succeeded in formulating mathematical expressions for the proposed technique, for the range over which it is effective, and have confirmed that within this range an extremely effective countermeasure is obtained. These mathematical expressions will later be explained in detail.

In a disk brake, braking is performed by friction between the surface of the disk rotor and the surface of two brake pads. As a result, the brake pads, the back-plates which press against these brake pads, the piston which applies the pressing force to these back-plates, and the caliper which surrounds the brake pads and the piston, are raised to an elevated temperature by the heat generated during braking. An elastic body and a weight that have been fitted to these members will also be affected by this heat. Because the weight and the elastic body, and the elastic body and the aforementioned members, are fixed together by gluing, the adhesive involved will likewise be affected by the heat.

This accelerates the deterioration of the elastic body and the adhesive. If wear powder generated during braking, this will also reduce the vibration damping performance of the elastic body. Although for practical purposes it is sufficient to simply fix the weight to an oscillating member by way of an elastic body, it has been found that deterioration of the elastic body and the adhesive, and loss of vibration damping performance of the elastic body, can be suppressed by providing a rod to which the weight and the elastic body are fitted. It has been confirmed that reliability can be improved in this way.

The formulation of mathematic expressions mentioned above will now be explained. These mathematical expressions are common to all the previously mentioned oscillating members.

The natural vibration frequency of the aforementioned weight fitted by way of an elastic body is given by:

$$f_0 = (1/(2\pi))\sqrt{(k/m)}$$

where m is the mass of the weight and k is the spring constant of the elastic body that is installed between the weight and an oscillating member. It has been confirmed experimentally that it is effective if this natural vibration frequency is set almost equal to or less than the frequency of the principal component of the noise frequency $f_s$ produced by the oscillating member. For example, setting the relation between noise frequency $f_s$ and natural vibration frequency $f_0$ to:

$$f_s > 2f_0$$

is effective over a wide range of noise frequencies $f_s$.

Conversely, it has also been found that in cases where the construction of the disk brake results in noise frequency $f_s$ being almost a single fixed frequency, weight reduction can be achieved by the following design scheme: reducing the mass m of the weight and bringing the aforementioned natural vibration frequency $f_0$ near to the noise frequency $f_s$.

In other words, it has been found that vibration damping of a frequency $f_s$ is effective if, in order to reduce the mass m of the weight, the following relation is set:

$$f_s \approx f_0$$

That is to say, it has been found that if the shape of the oscillating member is such that the noise frequency $f_s$ may be treated as being practically a single fixed value, it will be effective for $f_0$ to be nearly equal to or just slightly higher than the noise frequency $f_s$ produced by the oscillating member.

These remarks will be explained again in qualitative terms. When an oscillating member (in this case, the piston, back-plate, caliper, etc.) vibrates, if a weight has been fitted to this oscillating member by way of an elastic body, then at low frequencies this weight vibrates in same phase with the oscillating member. However, as the frequency increases the vibration of the weight gradually shifts out of phase from the vibration of the oscillating member, and when a certain frequency is exceeded the vibration of the weight will be opposite in phase: i.e., its phase will differ by 180 degrees. This means that vibration energy is converted to heat energy due to the elastic body deforming, with the result that the vibration of the oscillating member is suppressed. In other words, in order to suppress vibration, the frequency at which the vibration of the weight becomes opposite in phase to that of the oscillating member should be set so as to coincide with the frequency at which there is a pronounced generation of acoustic noise.

Instead of a single weight, a plurality of weights can be fitted to the aforementioned back-plate or caliper, each such weight being fitted by way of an aforementioned elastic body. When there is a wide range of brake noise frequencies, it is effective if the respective natural vibration frequencies of these plurality of weights are made to differ slightly from one another. The spring constant of an elastic body is determined by the nature of the material from which it is made and by its shape. A heat-resisting rubber or other plastic material is convenient to use as the material for the elastic body, the shape of which is preferably set on a theoretical and experimental basis so as to satisfy the aforementioned equations.

The present inventors have performed repeated experiments under a variety of conditions and have thereby confirmed empirically that brake noise emitted when a motor vehicle brakes can be effectively reduced. It has been confirmed time after time that if a weight of the sort described above is fitted by way of an elastic body to an oscillating member that generates noise, the noise is greatly reduced, and that the noise occurs again when the weight is removed.

Because the elastic body and the weight are inexpensive parts with a simple structure, the invention taught in this application enables brake noise to be reduced to a sufficient extent for practical purposes without incurring great expense. Moreover, replacement of the brake pads or the disk rotor does not result in any change in the performance of the invention.

Speaking in more concrete terms, the frequency of brake noise is generally not a uniform frequency but rather a mixture of a plurality of frequencies, and according to measurements is made up largely of frequency components exceeding 1 kHz. In greater detail still, the frequency components in the range 1.4 kHz to 2 kHz constitute an unpleasant noise.

Consequently, it is preferable to set the natural vibration frequency $f_0$ of the aforementioned weight fitted by way of an elastic body in the vicinity of 1 kHz, or to less than this. Experimental confirmation of this under a variety of conditions has shown that setting the natural vibration frequency $f_0$ to about 500 Hz is effective for a wide range of frequencies. It has also been verified that setting it even lower to 100 Hz is effective for reducing noise over an even wider range of frequencies. Making this natural vibration frequency $f_0$ even lower might be considered, but this would actually mean that the elastic material would have to be softer and the mass of the weight larger. It is therefore questionable whether this would be technically effective, and whether a suitable elastic material could be found which would be inexpensive.

Meanwhile, because the oscillating member heats up due to friction between the brake pad and the disk rotor, the material selected for the elastic body also has to have adequate heat resistance and durability. This requirement is another reason why it is difficult to select a very small value for the natural vibration frequency $f_0$. The experiments herein reported were performed using synthetic rubbers (or plastic materials) with various moduli of elasticity as the elastic material, and using a metal (specifically, lead) as the weight.

Such studies result in the conclusion that suitable materials can be found among synthetic rubbers (or plastic materials) with excellent heat resistance, and that it is technically advantageous to set the natural vibration frequency $f_0$ to around 100 Hz, or slightly higher to about 200 Hz, by making the mass of the weight of the order of several hundred grams, which is convenient for practical purposes.

DESCRIPTION OF THE PREFERRED EMBODIMENTS

First Embodiment

Figure 1:
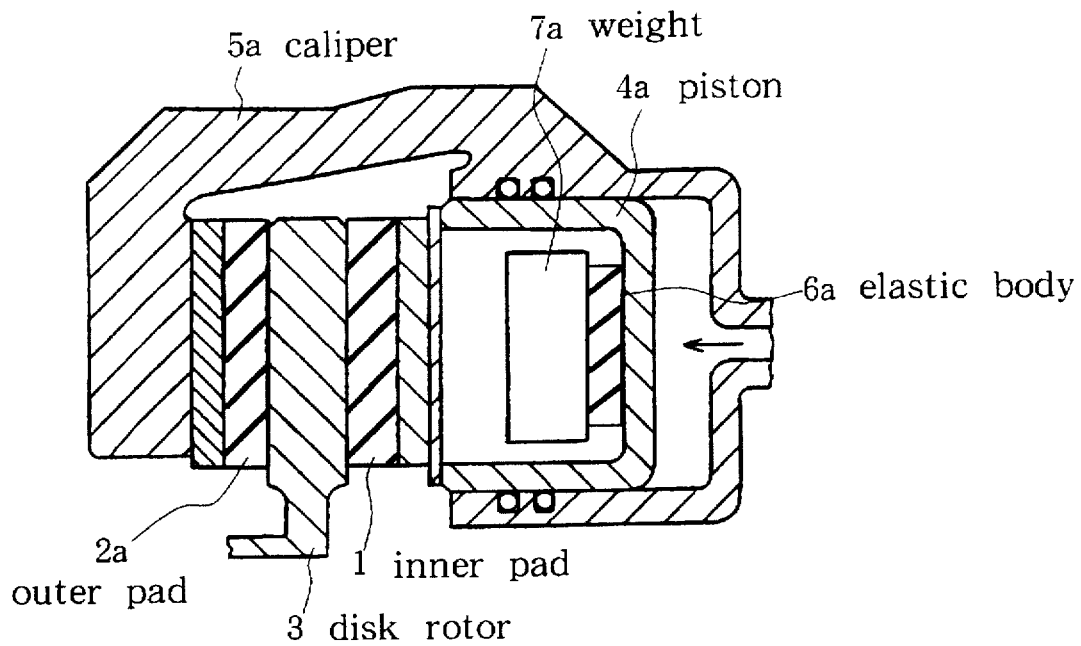
FIG. 1 is a partial enlarged sectional view showing the configuration of the essential parts of a first embodiment of this invention.
Figure 2:
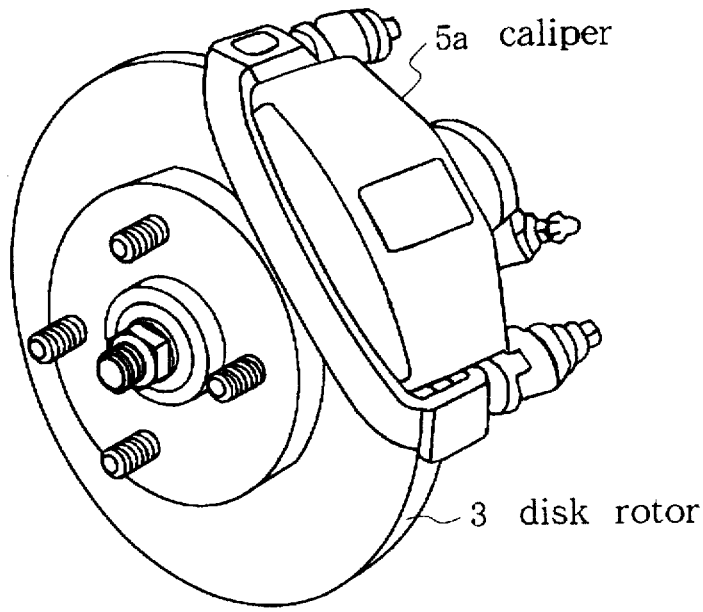
FIG. 2 is a perspective view showing the appearance and shape of the first embodiment of this invention.

FIG. 1 is a partially enlarged sectional view showing the configuration of the essential parts of a first embodiment of this invention, and FIG. 2 is a perspective view showing the appearance and shape of this embodiment.

The first embodiment of this invention has inner pad 1; outer pad 2a; disk rotor 3 which is sandwiched between this inner pad 1 and outer pad 2a, is fixed to the axle, and is subjected to a braking force; cup-shaped piston 4a which applies a displacement to inner pad 1 by means of a high pressure generated by a brake booster; and caliper 5a which houses this piston 4a and which provides the support within which disk rotor 3 can be gripped. In addition, weight 7a is fitted by way of elastic body 6a to the inside of piston 4a. The natural vibration frequency of weight 7a fitted by way of elastic body 6a, given by:

$$f_0 = (1/(2\pi))\sqrt{(k/m)}$$

where m is the mass of weight 7a and k is the spring constant of elastic body 6a, is set so as to be lower than the noise frequency $f_s$ due to this disk brake. Elastic body 6a and weight 7a are fixed by means of adhesive.

Next, the results of tests pertaining to this first embodiment of the invention thus constituted will be explained.

Test 1

Figure 3:
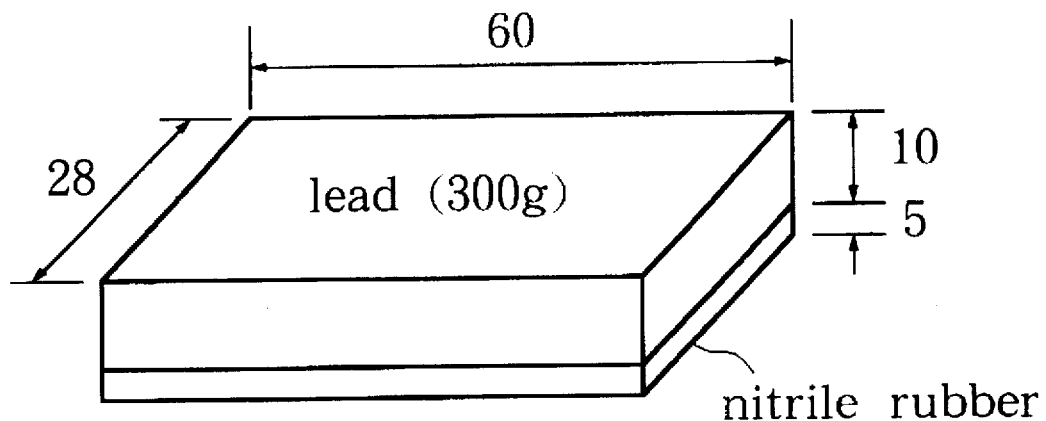
FIG. 3(a) and (b) are perspective views showing the appearance and shape of samples pertaining to the first embodiment of this invention.
Figure 3:
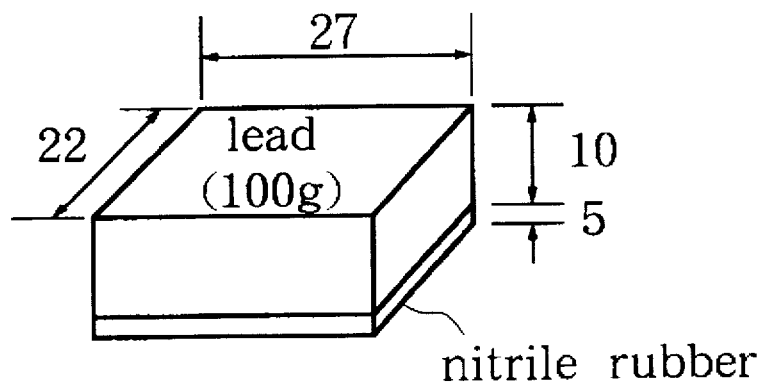

FIG. 3 shows the shapes of the weights and elastic bodies used in this test. The combination of a weight and an elastic body will here be termed a "sample". FIG. 3(a) shows the structure of sample 1, while FIG. 3(b) shows the structure of sample 2. Lead was used throughout as the material for the weights, and nitrile rubber with a hardness of 60 degrees was used for the elastic bodies. Sample 1 was larger, comprising a 60 mm×28 mm×10 mm weight with a mass of 300 g, and a 60 mm×28 mm×5 mm elastic body. Sample 2 was smaller, comprising a 27 mm×22 mm×10 mm weight with a mass of 100 g, and a 27 mm×22 mm×5 mm elastic body. A large number of these samples 1 and 2 were prepared.

Figure 4:
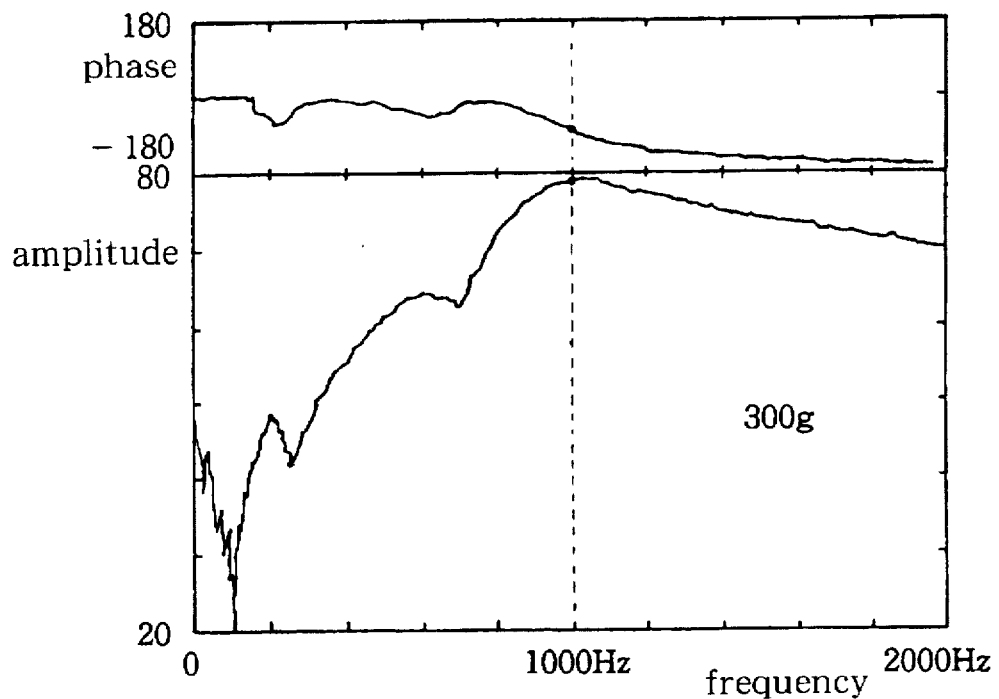
FIG. 4(a) and (b) show the results of hammering tests of the first embodiment of this invention.
Figure 4:
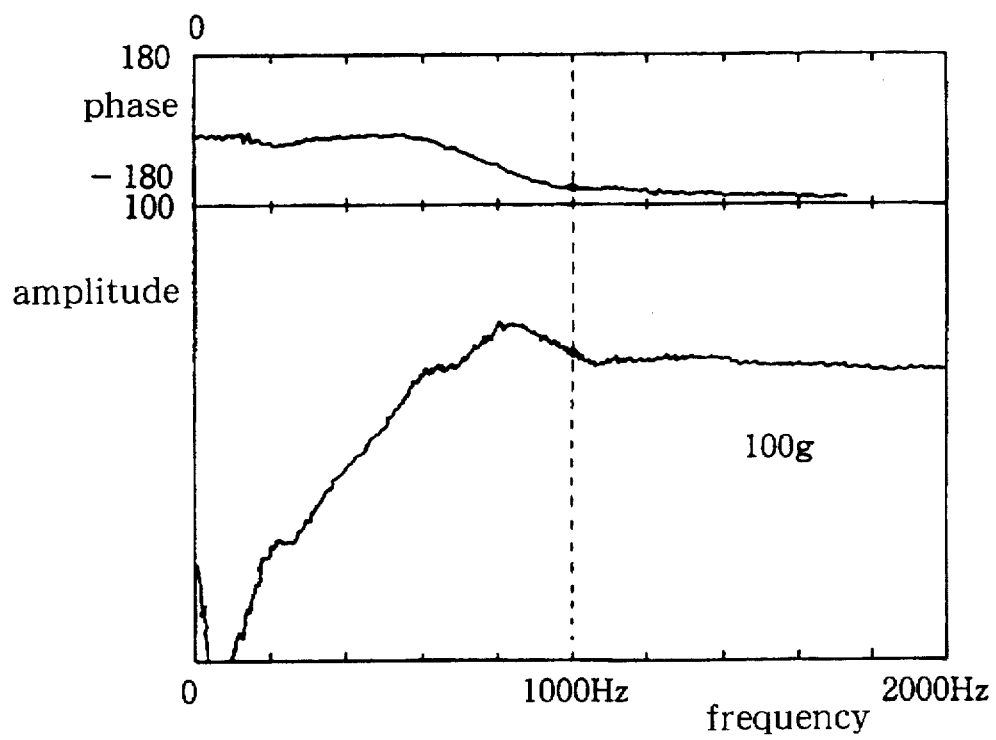

First of all, FIG. 4 shows the results of tests of samples alone, i.e., before the aforementioned samples were glued to piston 4a. FIG. 4(a) gives the results obtained with sample 1, while FIG. 4(b) gives the results obtained with sample 2. This test with samples alone was performed as follows. One each of sample 1 and sample 2 were glued separately to large platens and a hammer used to create an impact in their vicinity. The resulting vibrations were then detected. This was done by fitting pickups (accelerometer) to the samples and the platens, and converting their acoustic vibrations to electric signals. These electric signals were amplified by a wideband amplifier, frequency analysis performed using a two-channel spectrum analyzer, and recordings made of the vibration amplitude of the weight and of the phase difference between the vibrations of the weight and the platen. In FIG. 4, frequency is shown on the horizontal axis, while the amplitude and phase difference corresponding to a given frequency are shown on the vertical axis. The amplitude is a relative value plotted on a logarithmic scale. The units of phase difference are degrees.

Looking at the test results given in FIG. 4, it will be seen that in FIG. 4(a) the vibration of the weight has a large amplitude in the vicinity of 1000 Hz, and that the amplitude gradually decreases at higher frequencies that this. It will also be seen that although the phase difference between the vibration applied to the platen and the vibration of the weight is approximately zero in the low frequency region, there is a phase lag corresponding to an amplitude peak in the vicinity of 200 Hz. It will further be seen that the phase difference gradually increases with increasing frequency, becoming nearly −180 degrees when the frequency exceeds 1000 Hz: i.e., the vibration of the weight becomes opposite in phase to the vibration applied to the plate. This test result shows that the vibration of the weight suppresses the applied vibration. In FIG. 4(b) it will be seen that because the mass m of the weight is smaller, the term $\sqrt{(k/m)}$ (where k is the spring constant) is larger, and the frequency at which the amplitude is large is somewhat lower than in FIG. 4(a), and the frequency at which the vibration of the weight becomes opposite in phase to that of the platen is also lower.

Test results of this sort show that if a component similar to this sample 1 or sample 2 is fitted to piston 4a, the vibration of the weight will become opposite in phase at frequencies above 1000 Hz or 800 Hz, with the result that the vibration of the weight acts so as to suppress the vibration occurring in the brake member.

Test 2

Next, the results of tests of a disk brake will be explained.

Figure 5:
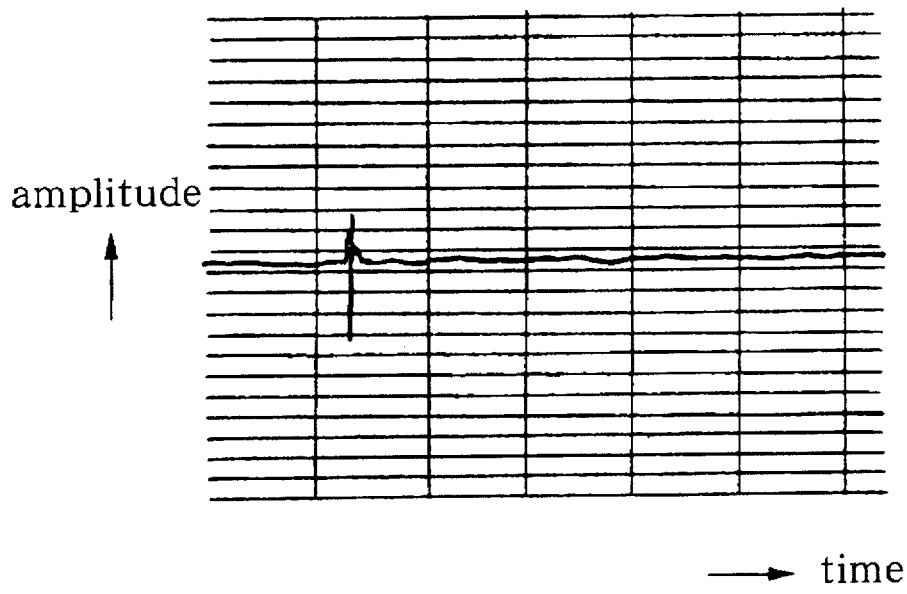
FIG. 5(a) and (b) show the results of hammering tests of the first embodiment of this invention and of a prior art example.
Figure 5:
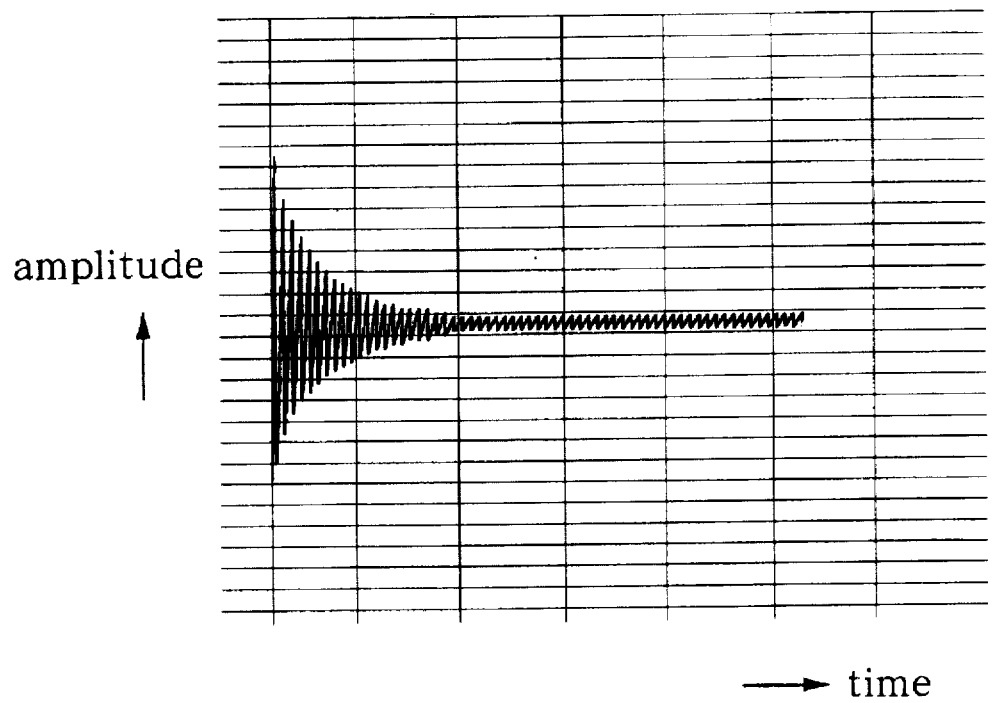

The tests were performed after the samples described above had been fitted to piston 4a in the manner shown in FIG. 1. The results of these tests are shown in FIG. 5, which is a recording of the damping of vibration amplitude obtained when piston 4a was placed on a sponge and hit once with a hammer. Namely, a pickup was fitted to piston 4a, the vibration converted to an electric signal, and this electric signal amplified by a wideband amplifier and then observed using an oscilloscope. In FIG. 5, the horizontal axis shows time and the vertical axis shows the relative value of the amplitude.

FIG. 5(a) gives the test results for the first embodiment of this invention, while FIG. 5(b) is a comparison. This comparison gives the results of a test in which similar measurements were made after the sample had been removed from piston 4a. FIG. 5 shows that with this embodiment of the invention, vibration does not persist after the application of the hammering, and that it is immediately damped and attenuated. In other words, it is seen that vibration of piston 4a is effectively damped by means of this invention. The acoustic responses shown in FIG. 5(a) and FIG. 5(b) are clearly distinguishable by ear as well.

Test 3

A running test was performed using an actual vehicle. All the weights and elastic bodies pertaining to this invention were removed and the vehicle was driven. When the brakes were applied, a loud noise occurred. It was then confirmed that when measures according to this invention were taken, no noise occurred at all. This was confirmed for a variety of running and braking conditions. It was also confirmed that if the weights and elastic bodies pertaining to this invention were removed a second time, brake noise occurred again.

As will be seen from these test results, by having a weight fitted by way of an elastic body, vibration generated during braking is damped and the occurrence of brake noise is reduced to a sufficient extent for practical purposes.

Second Embodiment

Figure 6:
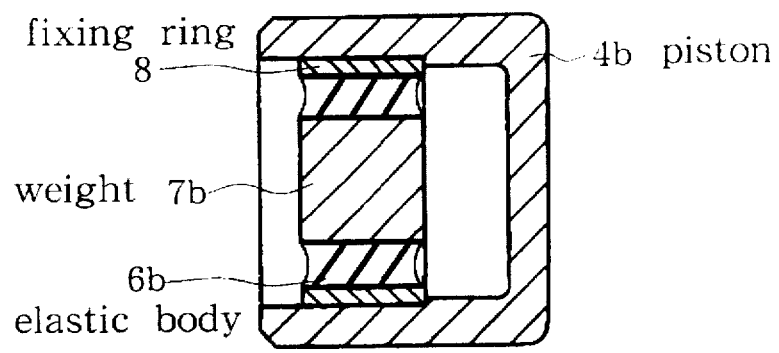
FIG. 6 is a partial sectional view showing the configuration of the essential parts of a second embodiment of this invention.

FIG. 6 is a partial sectional view showing the configuration of the essential parts of a second embodiment of this invention.

In this second embodiment, a step is provided on the inside of piston 4b at a particular depth, and fixing ring 8 is butted against this step and fixed in place, said fixing ring encircling weight 7b by way of elastic body 6b. The inner surface of piston 4b and the outer surface of fixing ring 8 are fixed together by press fitting or screwing. This second embodiment has the advantage that although there are more components, because weight 7b is fixed to ring-shaped elastic body 6b, the surface area supporting weight 7b is larger and hence fixing strength is greater.

Third Embodiment

Figure 7:
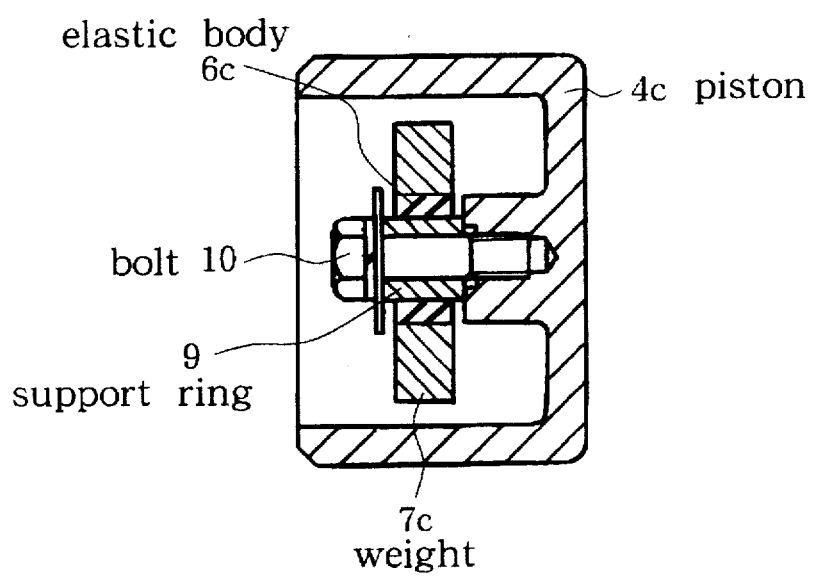
FIG. 7 is a partial sectional view showing the configuration of the essential parts of a third embodiment of this invention.

FIG. 7 is a partial sectional view showing the configuration of the essential parts in a third embodiment of this invention.

In this third embodiment of the invention, a convex portion is formed in the centre of the end wall inside piston 4c, a threaded hole is provided in this convex part, and after weight 7c has been fixed to support ring 9 by way of elastic body 6c, it is fixed to this convex part by means of bolt 10. This third embodiment has the advantage that if a replacement part comprising elastic body 6c and weight 7c fitted to support ring 9 is prepared beforehand, then replacement can be accomplished easily and involves simply unscrewing and then replacing bolt 10.

An explanation will now be given of the nature of vibration in this third embodiment of the invention.

Figure 8:
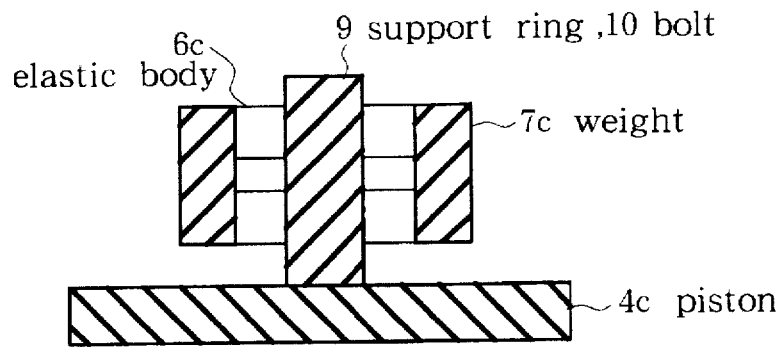
FIG. 8(a) shows the configuration of the third embodiment of this invention.
FIG. 8(b) shows the state in which this is subjected to vibration.
Figure 8:
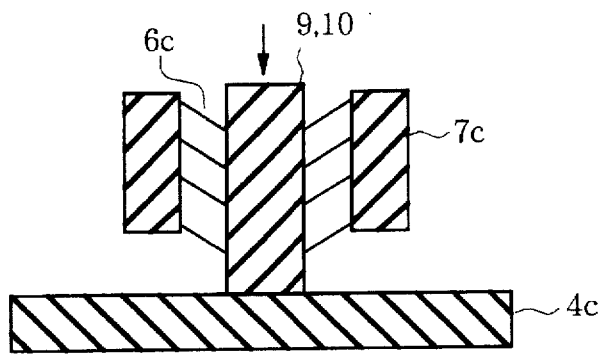
Figure 9:
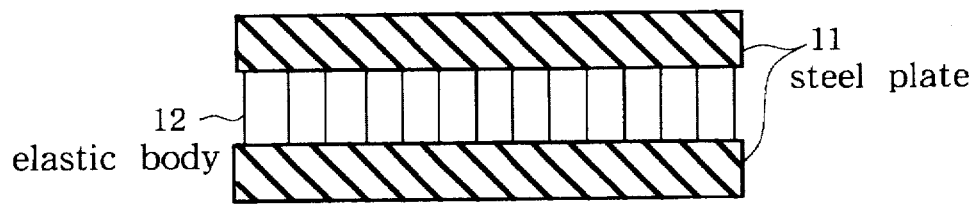
FIG. 9(a) shows a different vibration energy damping structure.
FIG. 9(b) shows the state in which this is subjected to vibration.
Figure 9:
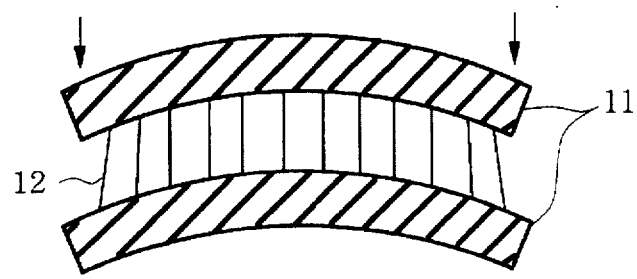

FIG. 8 shows the vibration energy damping structure of the third embodiment, while FIG. 9 schematises a known vibration energy damping structure that employs steel plates. FIG. 8(a) and FIG. 9(a) show the state of these structures before they are subjected to vibration, while FIG. 8(b) and FIG. 9(b) show their state when they are subjected to vibration. FIG. 8 shows the vibration energy damping structure of FIG. 7 turned through 90 degrees, so that support ring 9 is fixed upright on the inside of piston 4c by means of bolt 10, and weight 7c is fitted to this support ring 9 by way of elastic body 6c. Vibration generated in piston 4c by braking is transmitted to bolt 10, whereupon, as shown in FIG. 8(b), weight 7c undergoes large vertical displacements by way of elastic body 6c, with the result that the vibration energy is dissipated in the form of heat energy. With the structure shown in FIG. 9, where steel plates are used, elastic body 12 is arranged between two steel plates 11, whereupon steel plates 11 deform as shown in FIG. 9(b) when the structure is subjected to vibration, and vibration energy is converted to heat energy. However, comparison of this with the structure of the third embodiment of this invention shows that the deformation of elastic body 6c is greater than the deformation of elastic body 12. It will therefore be seen that the third embodiment gives more efficient damping of vibration energy.

Fourth Embodiment

Figure 10:
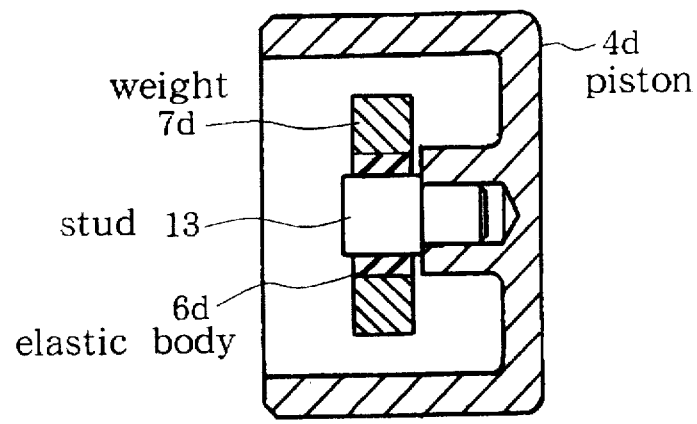
FIG. 10 is a partial sectional view showing the configuration of the essential parts of a fourth embodiment of this invention.

FIG. 10 is a partial sectional view showing the configuration of the essential parts of a fourth embodiment of this invention.

In this fourth embodiment, a convex portion is formed in the centre of the end wall inside piston 4d, a fitting hole is provided in this convex part, and stud 13 is press fit into this fitting hole, with weight 7d fitted around the outside of this stud by way of elastic body 6d.

Fifth Embodiment

Figure 11:
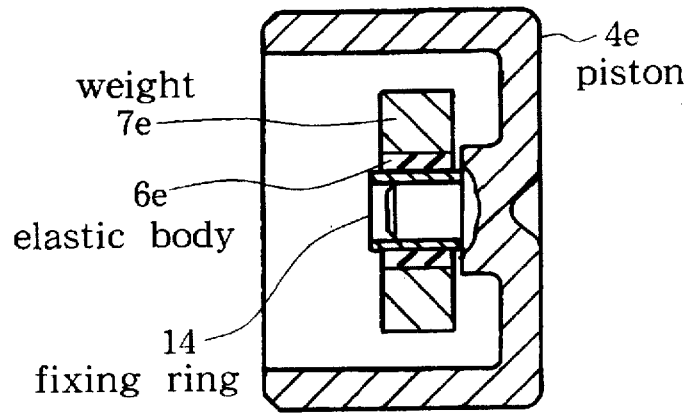
FIG. 11 is a partial sectional view showing the configuration of the essential parts of a fifth embodiment of this invention.

FIG. 11 is a partial enlarged sectional view showing the configuration of the essential parts in a fifth embodiment of this invention.

In this fifth embodiment, a convex part is formed in the centre of the end wall inside piston 4e, and a fitting pin is provided by machining this convex part. Fixing ring 14 is press fit onto this fitting pin, weight 7e being fitted to this fixing ring 14 by way of elastic body 6e.

Sixth Embodiment

Figure 12:
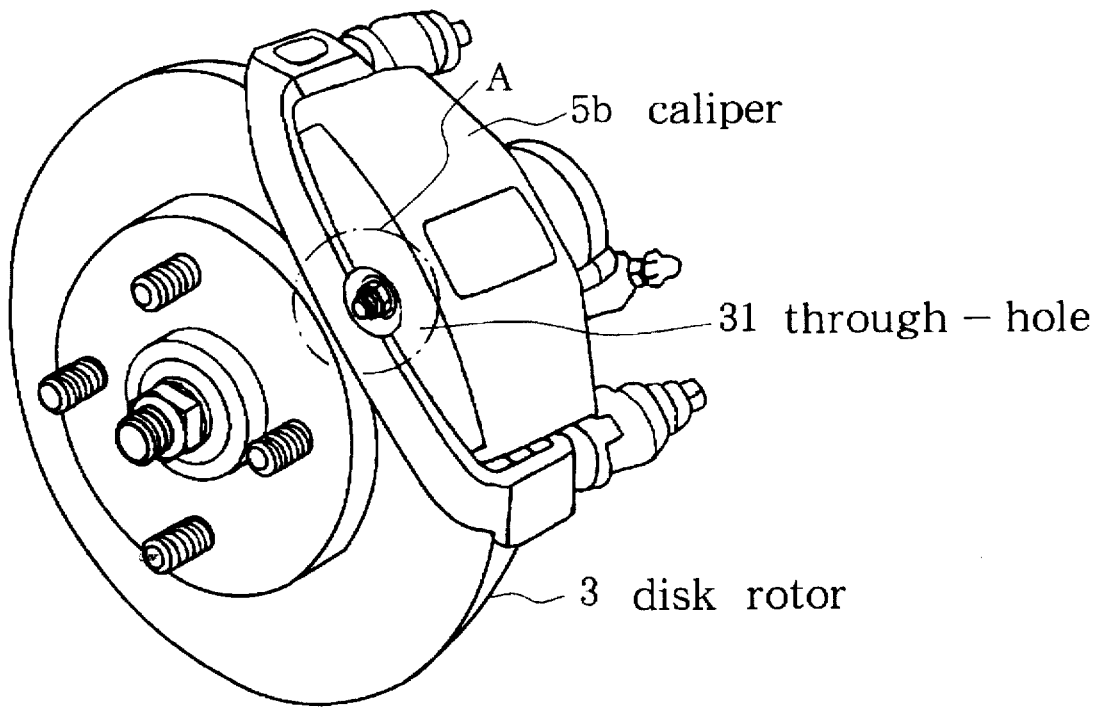
FIG. 12 is a perspective view showing the appearance and shape of a sixth embodiment of this invention.
Figure 13:
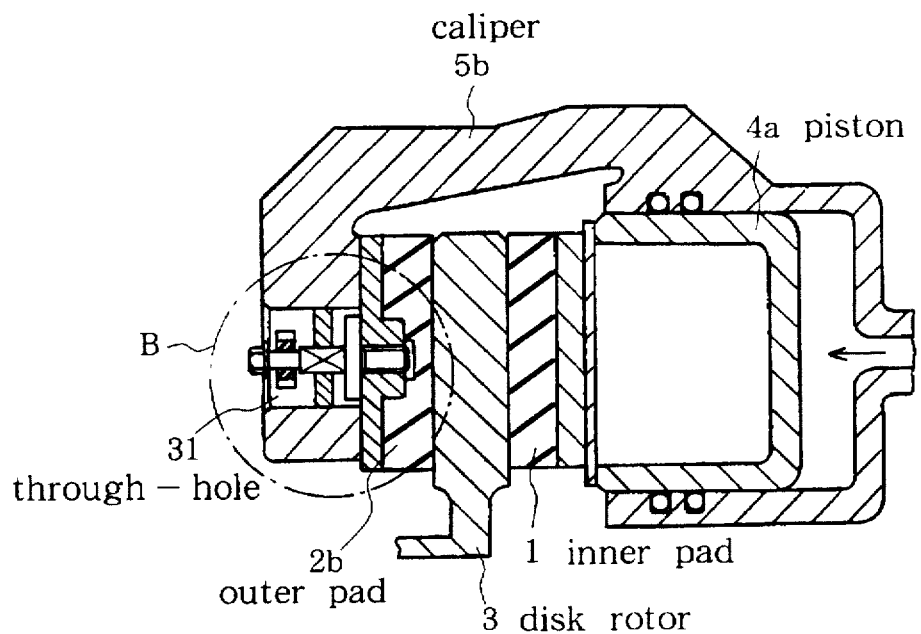
FIG. 13 is a partial enlarged sectional view showing the configuration of the essential parts of the sixth embodiment of this invention.
Figure 14:
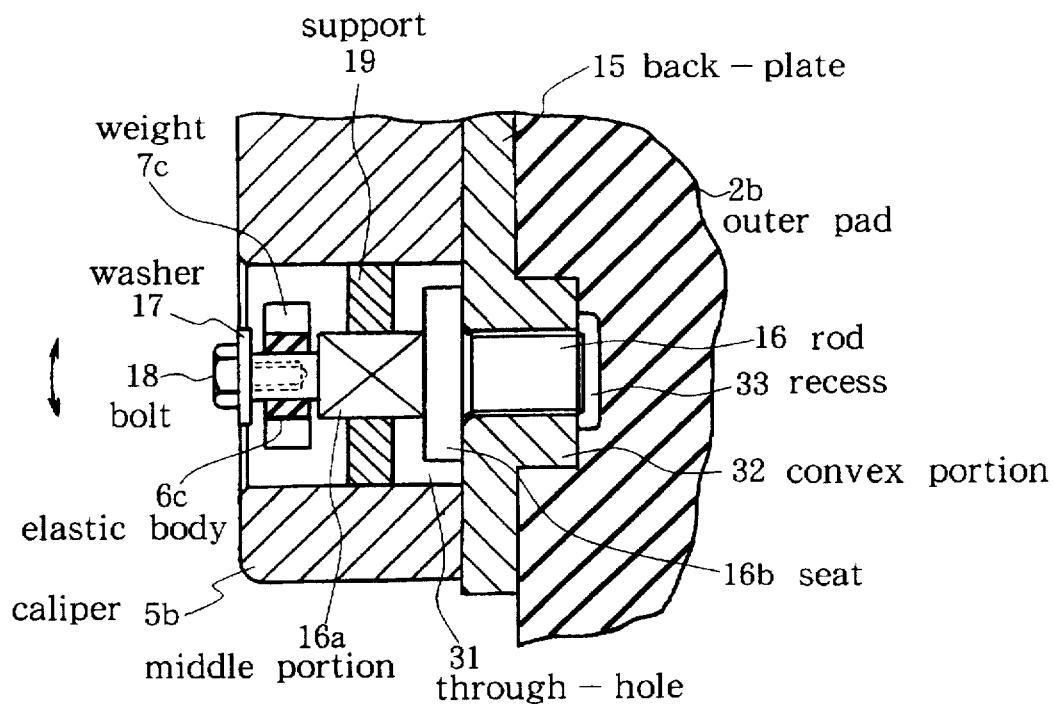
FIG. 14 is an enlarged view of area B, shown in FIG. 13, of the sixth embodiment of this invention.

FIG. 12 is a perspective view showing the appearance and shape of a sixth embodiment of this invention. FIG. 13 is a partially enlarged sectional view (of area A in FIG. 12) showing the configuration of the essential parts of this sixth embodiment. FIG. 14 is an enlarged view (of area B shown in FIG. 13) of this sixth embodiment.

This sixth embodiment of the invention has: inner pad 1; outer pad 2b; disk rotor 3 which is sandwiched between this inner pad 1 and outer pad 2b, is fixed to the axle, and is subjected to a braking force; cup-shaped piston 4a which applies a displacement to inner pad 1 by means of a high hydraulic pressure generated by a brake booster; and caliper 5b which houses this piston 4a and which provides the support within which disk rotor 3 can be gripped. This sixth embodiment also has: through-hole 31 provided at a prescribed position in caliper 5b; back-plate 15 which is fixed to the outer face of outer pad 2b and in which there is provided, at a position corresponding to through-hole 31 of caliper 5b, a threaded hole which is perpendicular to the face of said back-plate; rod 16, one end of which is screwed into the threaded hole in this back-plate 15 and thereby fixed; ring-shaped elastic body 6c through the middle of which the other end of rod 16 passes; weight 7c which is fixed in such manner as to encircle this elastic body 6c; washer 17 and bolt 18 which prevent elastic body 6c and weight 7c from coming off; and support 19 which supports middle portion 16a of rod 16.

Convex portion 32 for increasing the effective length of the threaded portion is formed on the side of back-plate 15 that faces outer pad 2b. In addition, seat 16b is provided on rod 16 and serves to stabilize the screw-in based fixing of rod 16 to back-plate 15; and middle portion 16a is formed as a square section cylinder in order to prevent rotation. The through-hole of support 19 through which this middle portion 16a passes is likewise formed with a square section. Recess 33 is formed in the side of outer pad 2b that corresponds to convex portion 32 of back-plate 15.

Weight 7c and elastic body 6c, and elastic body 6c and rod 16, are fixed together after press fitting, and gaps with a prescribed width are provided on the washer 17 side and the middle portion 16a side of elastic body 6c so that its deflection during vibration is not affected by any contact. Support 19 is an elastic body and can be deformed. Its circumference is glued to the inner surface of through-hole 31 which is provided in caliper 5b, and it is made of a synthetic resin which can slip easily along the axial direction. Rod 16 vibrates in the direction indicated by the arrows shown in FIG. 14, and this vibration is damped by elastic body 6c and weight 7c.

Seventh Embodiment

Figure 15:
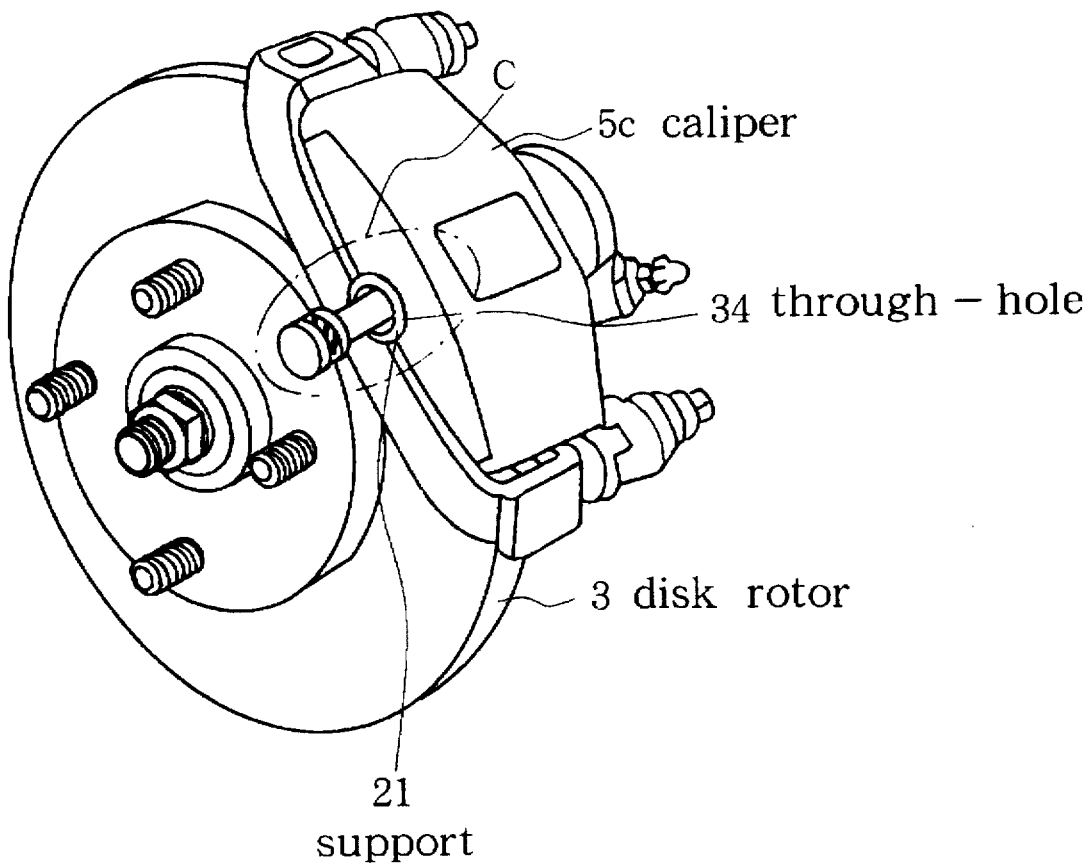
FIG. 15 is a perspective view showing the appearance and shape of a seventh embodiment of this invention.
Figure 16:
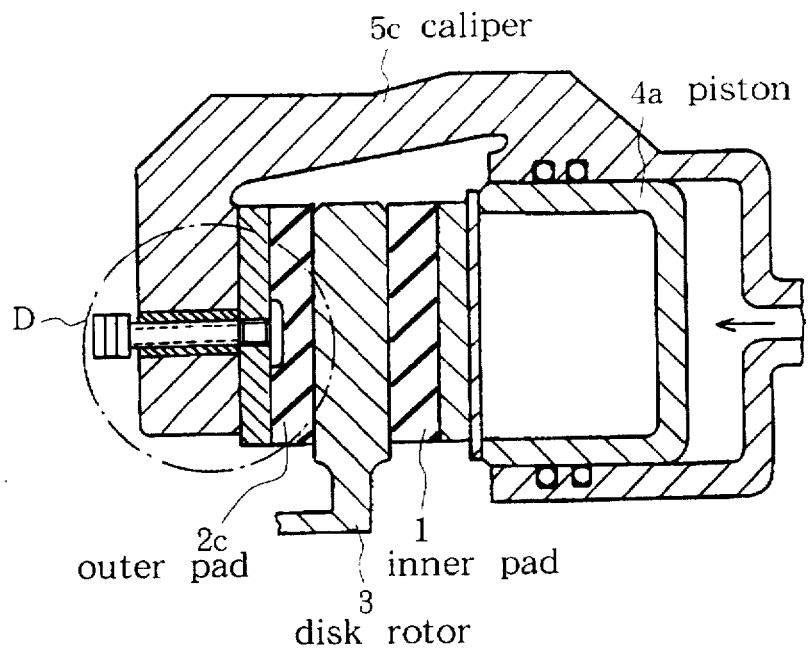
FIG. 16 is a partial sectional view showing the configuration of the essential parts of the seventh embodiment of this invention (being a sectional view of area C in FIG. 15.)
Figure 17:
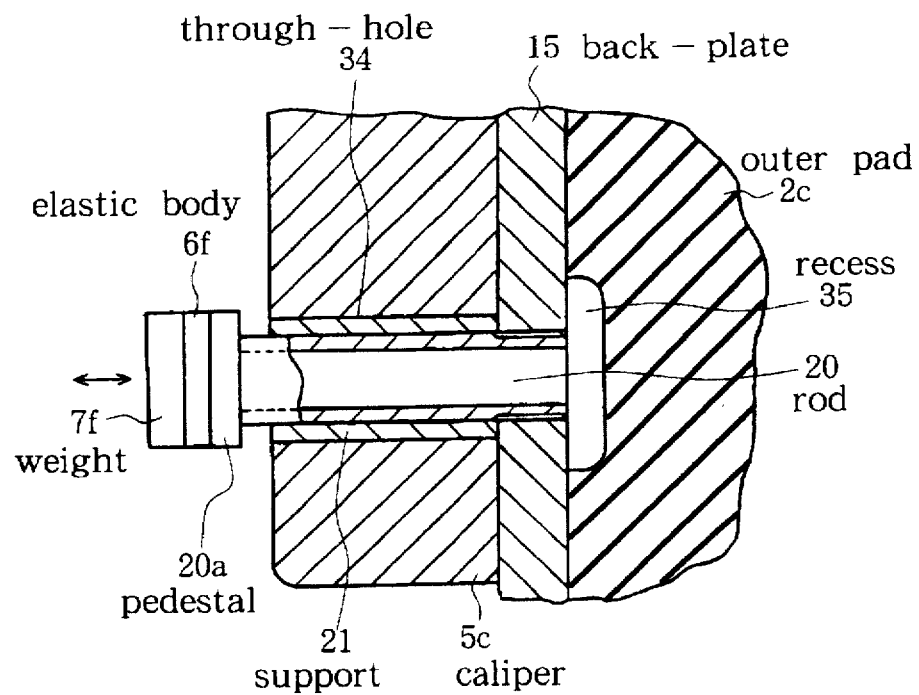
FIG. 17 is an enlarged view of area D, shown in FIG. 16, of the seventh embodiment of the invention.

FIG. 15 is a perspective view showing the appearance and shape of a seventh embodiment of this invention. FIG. 16 is a partial sectional view (of area C in FIG. 15) showing the configuration of the essential parts of this seventh embodiment. FIG. 17 is an enlarged view (of area D shown in FIG. 16) of this seventh embodiment.

In this seventh embodiment of the invention, cylindrical rod 20, on one end of which pedestal 20a is provided, has its other end screwed into plate-shaped back-plate 15; and this rod 20 is inserted into cylindrical support 21 which is provided inside through-hole 34, said through-hole being provided in caliper 5c. Weight 7f is fixed to pedestal 20a by way of elastic body 6f. Although pedestal 20a, elastic body 6f and weight 7f are all shown as being formed with circular sections, they may alternatively be formed with square sections. In addition, in order to avoid direct contact, recess 35 is provided in outer pad 2c at a position corresponding to rod 20. Other than this, this seventh embodiment is constituted in the same manner as the first embodiment. Moreover, the relation between noise frequency $f_s$ and the natural vibration frequency $f_0$ of weight 7f, which has been fitted by way of elastic body 6f, is set in the same manner as in the first embodiment. Rod 20 vibrates in the direction of the arrows shown in FIG. 17, and this vibration is damped by elastic body 6f and weight 7f.

This seventh embodiment so constituted has the following advantages. Due to the presence of recess 35, frictional heat generated when disk rotor 3 is gripped between inner pad 1 and outer pad 2c is not directly transferred to rod 20. Secondly, because rod 20 is formed with a hollow structure, heat transferred from its surroundings is dissipated and is therefore hindered from being transferred to elastic body 6f, which enables the life of elastic body 6f to be extended. Stainless steel or nonferrous metal with good heat insulating properties should be used for rod 20 to further improve its heat transfer characteristics.

Eighth Embodiment

Figure 18:
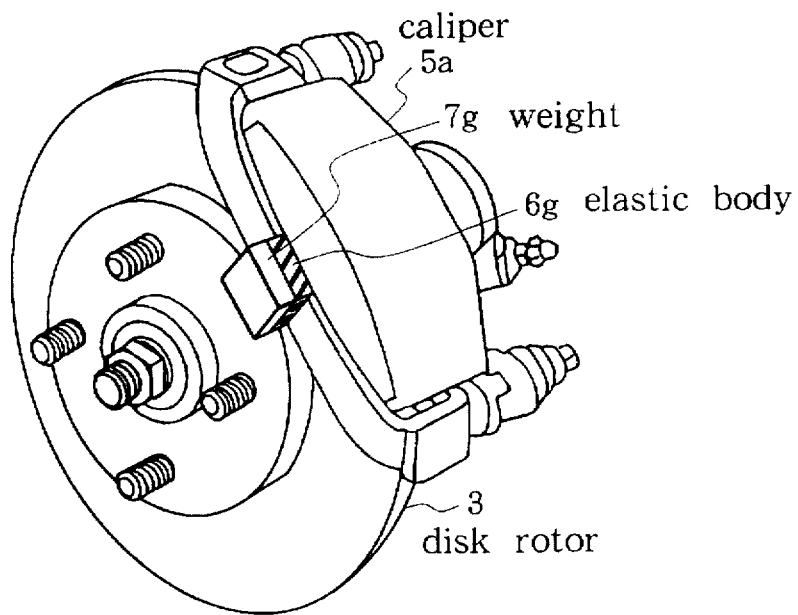
FIG. 18 is a perspective view showing the appearance and shape of an eighth embodiment of this invention.
Figure 19:
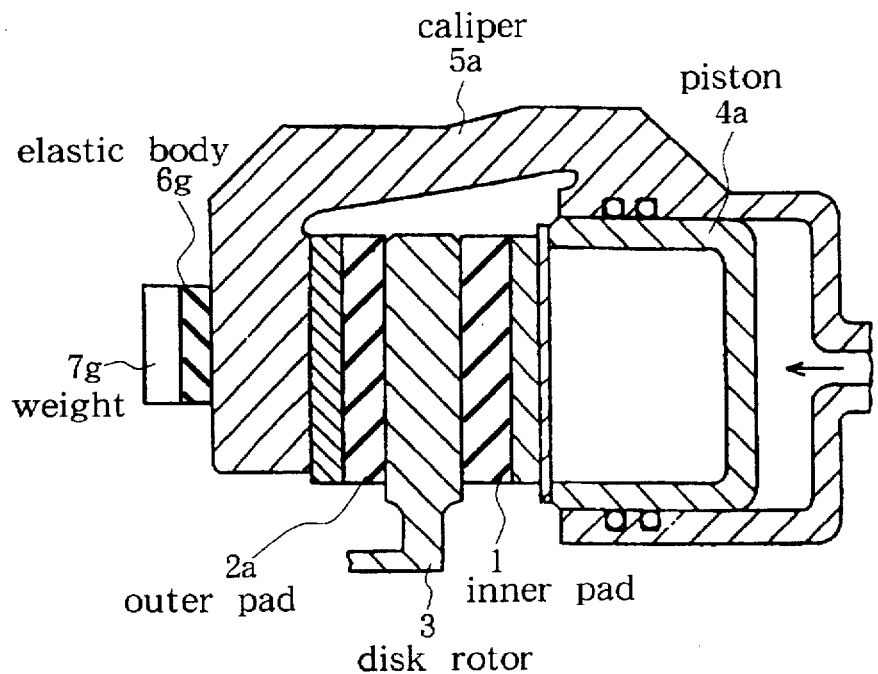
FIG. 19 is a partial enlarged sectional view showing the configuration of the essential parts of the eighth embodiment of this invention.

FIG. 18 is a perspective view showing the appearance and shape of an eighth embodiment of this invention, and FIG. 19 is a partial enlarged sectional view showing the configuration of the essential parts of this eighth embodiment.

This eighth embodiment of the invention has: inner pad 1 and outer pad 2a as the brake pads; disk rotor 3 which is sandwiched between this inner pad 1 and outer pad 2a, is fixed to the axle, and is subjected to a braking force; cup-shaped piston 4a which applies a displacement to inner pad 1 by means of high pressure generated by a brake booster; and caliper 5a which surrounds inner pad 1, outer pad 2a and piston 4a, which in turn press against disk rotor 3. In addition, weight 7g is fitted by way of elastic body 6g to the outer surface of caliper 5a.

In the case of this embodiment as well, the natural vibration frequency of weight 7g fitted by way of elastic body 6g, given by:

$$f_0 = (1/(2\pi))\sqrt{(k/m)}$$

where m is the mass of weight 7g and k is the spring constant of elastic body 6g, is set so as to be lower than the noise frequency $f_s$ produced by caliper 5a. Elastic body 6g and weight 7g are fixed by means of adhesive.

Ninth Embodiment

Figure 20:
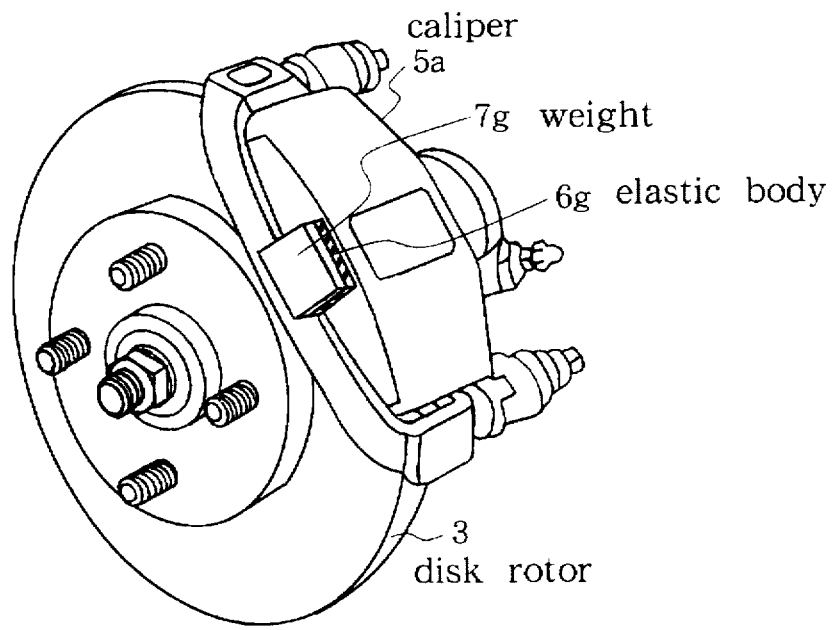
FIG. 20 is a perspective view showing the appearance and shape of a ninth embodiment of this invention.
Figure 21:
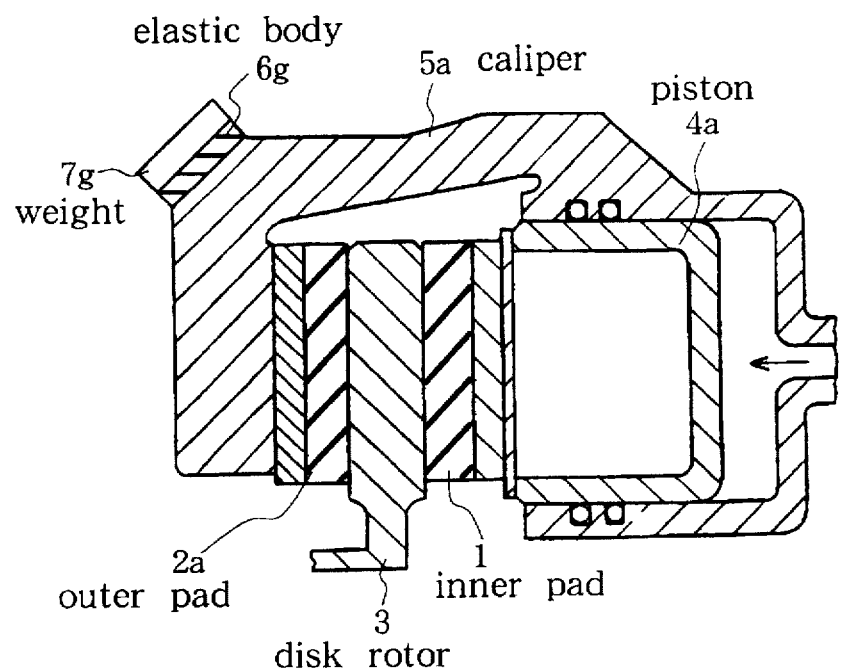
FIG. 21 is a partial enlarged sectional view showing the configuration of the essential parts of the ninth embodiment of this invention.
Figure 22:
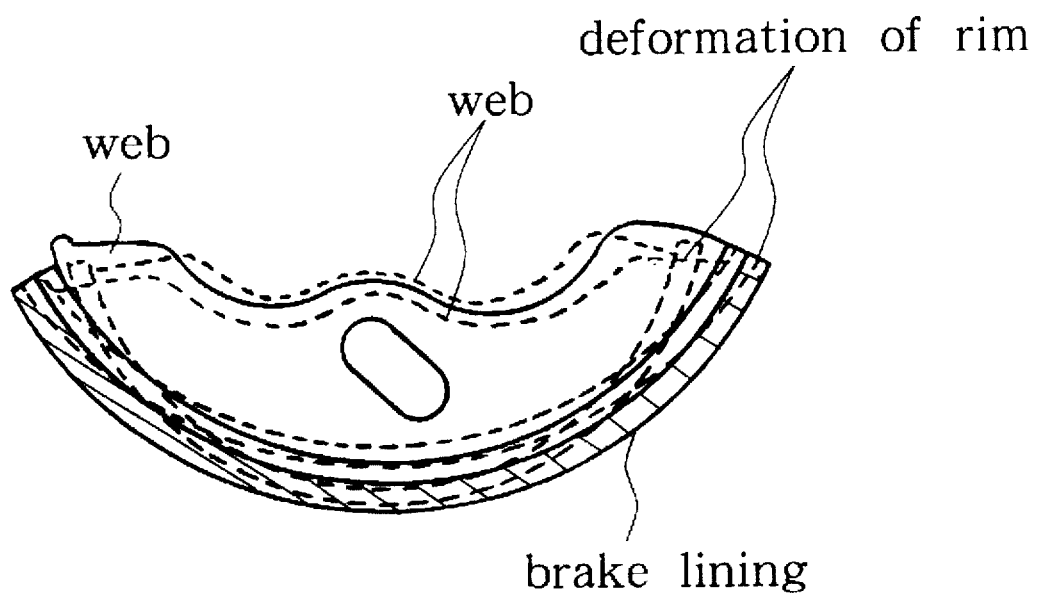
FIG. 22 serves to clarify the nature of brake shoe deformation when brake noise occurs during braking.
Figure 23:
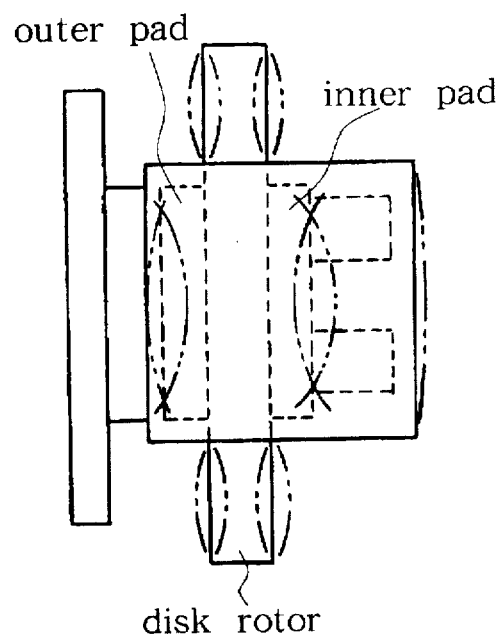
FIG. 23 serves to clarify the nature of disk brake deformation during braking.
Figure 24:
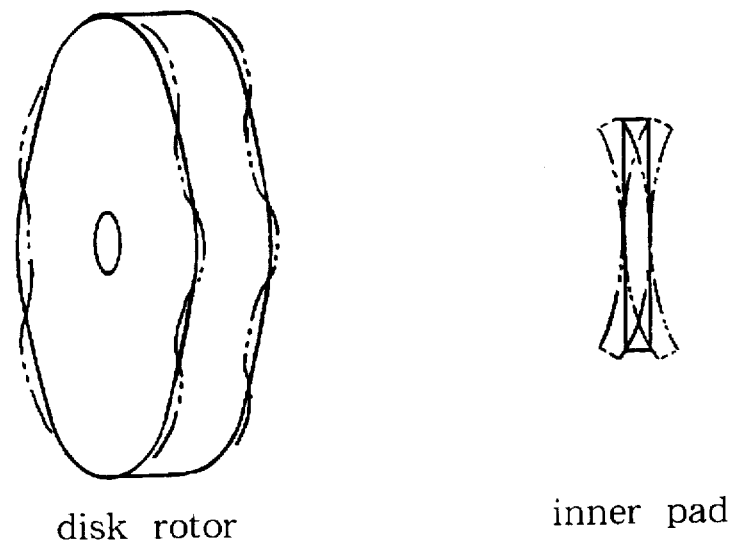
FIG. 24(a) serves to explain the nature of disk rotor deformation during braking, while FIG. 24(b) serves to explain the nature of deformation of the inner pad and the outer pad during braking.

FIG. 20 is a perspective view showing the appearance and shape of a ninth embodiment of this invention. FIG. 21 is a partial enlarged sectional view showing the configuration of the essential parts of this ninth embodiment.

In this ninth embodiment of the invention, weight 7g is fitted by way of elastic body 6g to an angled portion of caliper 5a. In other respects, this ninth embodiment is constituted in the same manner as the eighth embodiment, and can give a similar effect.

What is claimed is:

1. Disk brake device comprising:
   a piston which presses against a disk rotor by way of an inner pad in response to hydraulic pressure applied by a cylinder;
   a caliper formed integrally with this cylinder; and
   an outer pad which is supported by this caliper and which presses against the disk rotor in opposition to the piston;
   said disk brake device being characterized in that a weight fitted to the backplate of the outer pad by way of an elastic body;
   wherein a rod is fixed upright on the backplate, and the weight is fitted to the rod by way of the elastic body; and
   wherein a hole is provided in the caliper, and the rod passes through said hole.

2. Disk brake device as set forth in claim 1, wherein the natural vibration frequency of the weight fitted by way of the elastic body given by:

$$f_0 = (1/(2\pi))\sqrt{(k/m)}$$

wherein m is the mass of the aforementioned weight and k is the spring constant of the aforementioned elastic body, is set nearly equal to or lower than the noise frequency $f_s$ of an oscillating part of the disk brake device.

3. Disk brake device comprising:
   a piston which presses against a disk rotor by way of an inner pad in response to hydraulic pressure applied by a cylinder;
   a caliper formed integrally with this cylinder; and
   an outer pad which is supported by this caliper and which presses against the disk rotor in opposition to the piston;
   a weight fitted to the backplate of the outer pad via an elastic body; and
   a rod which is fixed upright on the backplate and is fitted to the weight via the elastic body, wherein the rod is long enough to pass entirely through a hole in the caliper so that the weight and the elastic body are positioned outside of the hole in the caliper.

4. Disk brake device as set forth in claim 3, wherein the natural frequency of the weight fitted through the elastic body given by $$f_0 = (1/(2\pi))\sqrt{k/m}$$

wherein m is the mass of the weight and k is the spring constant of the elastic body, is set nearly equal to or lower than a noise frequency $f_s$ of oscillating parts of the disk brake device.

5. A disk brake device as set forth in claim 3, wherein a recess is provided in the outer pad, said recess being positioned adjacent to the rod.

6. A disk brake device set forth in claim 3, wherein the rod is hollow.

* * * * *